United States Patent Office 2,924,597
Patented Feb. 9, 1960

2,924,597

PROCESS FOR THE PREPARATION OF 17α HYDROXY - PROGESTERONE, ESTERS THEREOF, AND INTERMEDIATES THEREFOR

Pietro de Ruggieri and Gian Antonio de Ferrari, Milan, Italy, assignors to Ormonaterapia Richter S.p.A., Milan, Italy No Drawing. Application April 8, 1958
Serial No. 727,064

7 Claims. (Cl. 260—239.55)

An object of this invention is to provide a method for protecting the 17α-hydroxy compounds of the pregnane series through the formation of 17α-tetrahydropyranyl ethers. These compounds which are obtained by reaction with 2,3-dihydropyran in the presence of $POCl_3$, are extremely stable against alkaline reagents, thus permitting reactions which would not be possible with the free 17α-hydroxy compounds.

By this method there are obtained compounds of high biological activity in the field of the progestative and cortical hormones, especially 17α-hydroxy-progesterone and its 17-esters.

As a starting material, 17α-hydroxy-pregnenolone-3-acetate (P. L. Julian, E. W. Meyer and I. Ryden, J. Am. Chem. Soc. 72, 367 (1950)), has been selected. Upon treatment with 2,3-dihydropyran in the presence of catalytic amounts of phosphorous oxychloride it is converted to the corresponding 17-tetrahydropyranyl ether, which, after alkaline hydrolysis of the 3-acetate group and subsequent oxidation of the resulting 3-hydroxy group, yields the 17α-tetrahydropyranyl ether of 17α-hydroxy-progesterone.

The latter compound, through hydrolysis in the presence of an acid such as hydrochloric, sulfuric or p-toluene-sulfonic acids, yields 17α-hydroxy progesterone, while reaction with acetic anhydride in the presence of p-toluenesulfonic acid followed by treatment with alkali, yields 17α-acetoxy-progesterone.

Reaction with the anhydrides of other aliphatic carboxylic acids having 2-7 carbon atoms in the presence of p-toluenesulfonic acid yield the corresponding diesters, which, after partial saponification, yield a 17α-acyloxy-progesterone.

The following examples are given to further illustrate the present invention, the scope of the invention not however being limited to the specific details of the examples.

Example 1

1 part of 17α-hydroxy-pregnenolone-3-acetate was dissolved in 6 parts of 2,3-dihydropyran. 0.05 part of $POCl_3$ was added and the solution was left 24 hours at room temperature. Then it was diluted with diethyl ether, washed with 2 N aqueous solution of $Na_2CO_3$ followed by water, dried over $Na_2SO_4$ and concentrated in vacuo to dryness. After crystallisation of the residue from aqueous acetone, the 17α-tetrahydropyranyl ether of 17α-hydroxy-pregnenolone-3-acetate was obtained, with melting point 136–139° C. and $[\alpha]_D = -14°$ (dioxane).

Example 2

0.4 part of the 17α-tetrahydropyranyl ether of 17α-hydroxy-pregnenolone-3-acetate was dissolved in 15 parts of boiling methanol. Over a period of 20 minutes there was added 0.210 part of $K_2CO_3$ dissolved in 2 parts of water and 3 parts of methanol. The reaction mixture was boiled for an additional 70 minutes, then neutralized with acetic acid, diluted with a little water and concentrated until crystallisation occurs. The precipitate of 17α-tetrahydropyranyl ether of 17α-hydroxy pregnenolone melts at 138–143° C.

Example 3

1.2 parts of the 17α-tetrahydropyranylether of 17α-hydroxy-pregnenolone were dissolved in 32 parts of toluene and 10 parts of cyclohexanone. 8 parts of solvent were distilled off and over a period of 20 minutes there was added 0.6 part of aluminum isopropoxide dissolved in 24 parts of toluene. After the addition, the reaction mixture was slowly distilled for an additional 20 minutes, and then there were added 60 parts of sodium and potassium tartrate in 9 parts of water. After decantation of the aqueous phase, the mixture was washed with water and the organic phase was steam-distilled until the solvent was completely eliminated. The remaining aqueous suspension was repeatedly extracted with diethyl ether. The combined extracts, after drying over sodium sulfate were concentrated to dryness. After crystallisation of the residue from aqueous methanol there was obtained the 17α-tetrahydropyranyl ether of 17α-hydroxy-progesterone, melting at 145–148° C. $[\alpha]_D = +84°$ (acetone).

Example 4

0.2 part of the 17α-tetrahydropyranylether of 17α-hydroxy-progesterone in 3 parts of 95% ethanol was reacted at the boiling point for sixty minutes, with 0.015 part of p-toluenesulfonic acid. The mixture was concentrated to half volume and crystallized by adding water. The obtained product melts at 218–220° C. and does not show a melting point depression when mixed with a sample of 17α-hydroxy-progesterone, prepared by a different method. $[\alpha]_D = +104°$ (acetone).

Example 5

0.2 part of the 17α-tetrahydropyranylether of 17α-hydroxy-progesterone dissolved in 10 parts of acetic anhydride was kept at 80° C. for 40 minutes in the presence of 0.005 part of p-toluenesulfonic acid. After cooling, the crystallized product was filtered, suspended in 7 parts of methanol and treated during 15 minutes with 0.04 part of potassium hydroxide in methanol. After neutralisation with acetic acid, partial concentration and cooling, the resulting 17α-acetoxy-progesterone was filtered. It melted at 240–243° C., undepressed when mixed with an authenic sample of the compound. $[\alpha]_D = +55°$ (dioxane).

Example 6

0.2 part of the 17α-tetrahydropyranylether of 17α-hydroxy-progesterone dissolved in 1.5 parts of caproic anhydride was kept at 80° C. for 40 minutes in the presence of 0.005 part of p-toluenesulfonic acid. The solution was cooled, diluted with 10 parts of methanol and treated under a nitrogen stream for a period of 15 minutes at room temperature with 0.825 part of potassium hydroxide in methanol. After dilution with water, the mixture was repeatedly extracted with diethyl ether. The combined extracts were washed with water, dried over sodium sulfate and concentrated to a small volume. Upon adding petroleum ether, crystallisation took place. The product, crystallized from aqueous methanol, has $[\alpha]_D = +61°$ (chloroform) and a M.P. 119–121° C., undepressed when mixed with an authentic sample of 17α-capronoxy-progesterone.

It is to be understood that the invention is not to be limited to the exact details or exact compounds shown and described, as obvious modifications and equivalents will be apparent to one skilled in art, and the invention is therefore to be limited only by the scope of the appended claims.

We claim:
1. The 17α-tetrahydropyranylether of 17α-hydroxypregnenolone-3-acetate.
2. The 17α-tetrahydropyranylether of 17α-hydroxypregnenolone.
3. The 17α-tetrahydropyranylether of 17α-hydroxyprogesterone.
4. A method of preparing the 17-tetrahydropyranyl ether of progesterone comprising reacting 17α-hydroxypregnenolone-3-acetate with 2,3-dihydropyran in the presence of catalytic amounts of phosphorous oxychloride to produce the 17-tetrahydropyranyl ether of 17α-hydroxypregnenolone-3-acetate, the 17-tetrahydropyranyl ether group being completely stable toward alkaline reagents; hydrolyzing said 17-tetrahydropyranyl ether of 17α-hydroxy-pregnenolone-3-acetate under alkaline conditions to produce the 17-tetrahydropyranyl ether of 17α-hydroxy-pregnenolone; and contacting said 17α-tetrahydropyranyl ether of 17α-hydroxy-pregnenolone with an oxidizing agent comprising aluminum isopropoxide-cyclohexanone in toluene solution to produce said 17-tetrahydropyranyl ether of progesterone.
5. The method of claim 4 in which said 17-tetrahydropyranyl ether of progesterone is hydrolyzed in the presence of an acid selected from the group consisting of hydrochloric, sulfuric and p-toluenesulfonic acids to produce 17α-hydroxy-progesterone.
6. The method of claim 4 in which said 17-tetrahydropyranyl ether of progesterone is reacted with an anhydride of an aliphatic carboxylic acid having two to seven carbon atoms in the presence of p-toluenesulfonic acid and in which the compound formed by this last-mentioned reaction is treated with an alkali to produce 17-acyloxy progesterone, the acyloxy group being derived from said carboxylic acid.
7. A method of preparing the 17-tetrahydropyranyl ether of pregnenolone comprising reacting 17α-hydroxypregnenolone-3-acetate with 2,3-dihydropyran in the presence of catalytic amounts of phosphorous oxychloride to produce the 17-tetrahydropyranyl ether of 17α-hydroxypregnenolone-3-acetate, the tetrahydropyranyl ether group being completely stable toward alkaline reagents; and hydrolyzing said 17-tetrahydropyranyl ether of 17α-hydroxy-pregnenolone-3-acetate under alkaline conditions to produce said 17-tetrahydropyranyl ether of pregnenolone.

References Cited in the file of this patent
UNITED STATES PATENTS

| | | |
|---|---|---|
| 2,637,728 | Ott et al. | May 5, 1953 |
| 2,782,211 | Wettstein et al. | Feb. 19, 1957 |

OTHER REFERENCES

Hirschmann et al.: 76 J.A.C.S. 4021 (1954).